No. 877,239. PATENTED JAN. 21, 1908.
G. SCHOENNER.
COMPASS HEAD.
APPLICATION FILED NOV. 28, 1906.
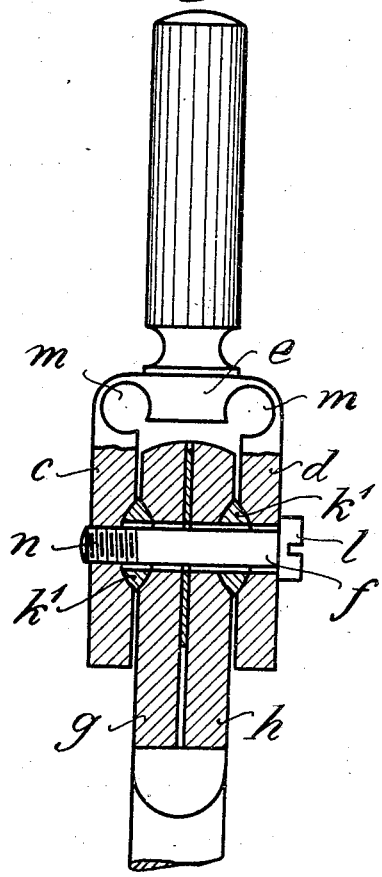
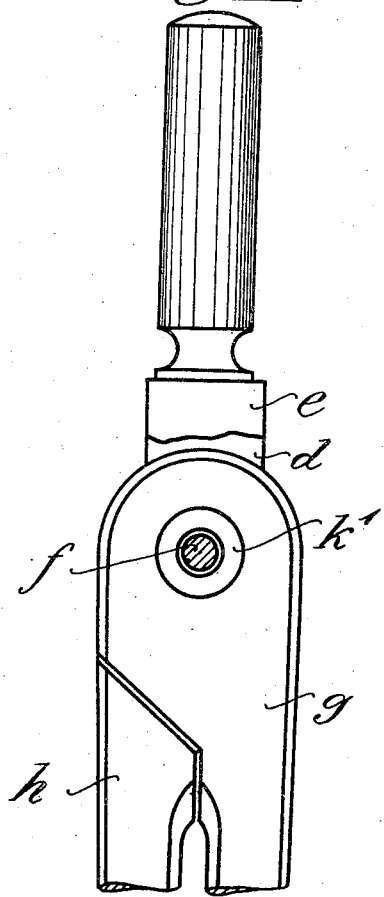
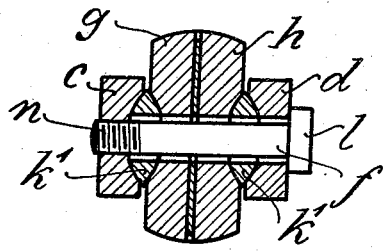
WITNESSES
INVENTOR
Georg Schoenner
BY Richardson
ATTYS

UNITED STATES PATENT OFFICE.

GEORG SCHOENNER, OF NUREMBERG, GERMANY.

COMPASS-HEAD.

No. 877,239.

Specification of Letters Patent.

Patented Jan. 21, 1908.

Application filed November 28, 1906. Serial No. 345,541.

*To all whom it may concern:*

Be it known that I, GEORG SCHOENNER, manufacturer, subject of the German Emperor, residing at Nuremberg, Bavaria, Germany, have invented new and useful Improvements in or Relating to Compass-Heads, of which the following is a specification.

In spring heads of known type for compasses the head joint is formed by means of two screws fixed in or of pins driven into each arm of the yoke which screws or pins of course must be arranged in the axis of the head joint and consequently compel the tightening screw necessary for holding together the legs of the compass and regulating the friction between the jaws of the compass head, to be placed below the compass hinge. As compared with this, by the present invention a simplified construction of the head of compasses with spring holding yokes is obtained, by perforated lens or semi-lens shaped disks, inserted in suitable recesses in the jaws of the compass head, being employed for mounting the latter on the compass legs, which disks when the holding yoke is sprung open may be introduced or removed from between the legs of the compass and the jaws of the compass head, and which permits the arrangement of the regulating screw in the axis of the head joint.

One form of construction of a compass head of this kind is shown in the accompanying drawings in which Figure 1 is an elevation and partial section; Fig. 2, an elevation at right angles to Fig. 1; and Fig. 3, a section of a detail.

In this form of construction the holding yoke $c$—$d$—$e$ is given a spring action by recesses $m$ being formed in the corners or rounded parts at the place where the yoke arms $c$—$d$ merge into the bar $e$. The legs $g\ h$ of the compass have on their outer side, and the arms $c\ d$ of the yoke on their inner side, recesses which form a segment of a sphere with lens-shaped disks $k'$ lying therein, which disks serve for holding the said parts apart, and enabling them to bear on one another.

The necessary tightening screw $f$ for regulating the clamping pressure of the jaws of the compass head rests with its head $l$ against the outside of one leg of the yoke, and by means of a thread $n$ engages in the other leg, while its stem passes loosely through the suitably bored lens shaped pieces and also the legs $g\ h$ of the compass head. In consequence of this centrical arrangement of the tightening screw $f$, the arm $d$ of the yoke is relieved of any tendency to bend arising from the pull of the screw $f$.

Of course a modification might also be adopted, in which the joint or hinge disks $k'$ have the form of a segment of a sphere or half lens and rest with their flat sides in cylindrical recesses on the arms of the compass head, beyond which only the spherical face inwardly projects.

I declare that what I claim is:—

In a compass, a holding yoke having recesses therein where the legs of the yoke join the head thereof so as to give said yoke a spring action, said legs having holes therein and recesses surrounding the holes on the interior face of each leg, legs $g$, and $h$ of the compass having corresponding recesses therein, disks having holes therein fitting in the orifices formed by the said recesses and a screw holding the parts together.

In testimony whereof I have signed my name to this specification in the presence of two subscribing witnesses.

GEORG SCHOENNER.

Witnesses:
LEONHARD KOERBER,
HERMANN DOCHTEMANN.